(12) United States Patent
Mokady et al.

(10) Patent No.: US 8,931,353 B2
(45) Date of Patent: Jan. 13, 2015

(54) CORIOLIS MASS FLOW METER AND COMPONENTS THEREOF

(75) Inventors: Tal Mokady, Shimshit (IL); Ran Gabai, Haifa (IL)

(73) Assignee: Precim Ltd., Arava (IE)

( * ) Notice: Subject to any disclaimer, the term of this patent is extended or adjusted under 35 U.S.C. 154(b) by 114 days.

(21) Appl. No.: 13/512,154

(22) PCT Filed: Dec. 2, 2010

(86) PCT No.: PCT/IL2010/001020
§ 371 (c)(1),
(2), (4) Date: May 25, 2012

(87) PCT Pub. No.: WO2011/067766
PCT Pub. Date: Jun. 9, 2011

(65) Prior Publication Data
US 2013/0112009 A1    May 9, 2013

Related U.S. Application Data

(60) Provisional application No. 61/266,180, filed on Dec. 3, 2009.

(51) Int. Cl.
*G01F 1/84* (2006.01)
(52) U.S. Cl.
CPC ............. *G01F 1/845* (2013.01); *G01F 1/8413* (2013.01); *G01F 1/8472* (2013.01); *G01F 1/8477* (2013.01); *G01F 1/8409* (2013.01)
USPC .................................................... 73/861.354

(58) Field of Classification Search
USPC ....................... 73/861.355–861.357
See application file for complete search history.

(56) References Cited

U.S. PATENT DOCUMENTS

| | | |
|---|---|---|
| 4,381,680 A | 5/1983 | Shiota |
| 4,823,614 A | 4/1989 | Dahlin |
| 6,041,665 A | 3/2000 | Hussain |
| 6,415,668 B1 | 7/2002 | Cage |
| 6,598,281 B2 | 7/2003 | Cook et al. |
| 6,805,013 B2 | 10/2004 | Amabili et al. |
| 2003/0084559 A1 | 5/2003 | Cook et al. |

FOREIGN PATENT DOCUMENTS

| | | |
|---|---|---|
| EP | 1923675 | 5/2008 |
| WO | WO 2004/011894 | 2/2004 |
| WO | WO 2009/134827 | 11/2009 |

OTHER PUBLICATIONS

International Search Report and Written Opinion from International Application No. PCT/IL2010/001020 mailed Nov. 17, 2011.

*Primary Examiner* — Jewel V Thompson
(74) *Attorney, Agent, or Firm* — Dorsey & Whitney LLP (57) ABSTRACT

A Coriolis mass flow meter and components thereof. One such component being a conduit having an inlet, an outlet, and a curved shape extending therebetween, and defining therein a flow path lying in an imaginary plane. The inlet and outlet each have an internal cross-sectional area having a first dimension in a direction along the plane and a second dimension in a direction perpendicular thereto. The first and second dimensions are the largest dimensions of each internal cross sectional area in the respective directions. The first dimension having a different magnitude of length than the second dimension.

21 Claims, 7 Drawing Sheets

CORIOLIS MASS FLOW METER AND COMPONENTS THEREOF

FIELD

The subject matter of the present application relates to a Coriolis mass flow meter, and in particular meters having components such as conduits having curved flow paths and splitters for such conduits.

BACKGROUND

There are different ways to measure a flow rate of fluids (liquids and gases).

One way is to include some kind of moving element in direct contact with the fluid that serves to measure the flow rate.

Another way is to measure the flow rate without such moving element, for example, is by using Coriolis, magnetic, ultrasonic, vortex, and thermal technologies.

An example mass flow meter which operates according to the Coriolis principle is disclosed in U.S. Pat. No. 6,041,665.

SUMMARY

In accordance with a first aspect of the subject matter of the present application, there is provided a Coriolis mass flow meter conduit having an inlet, an outlet, and a curved shape extending therebetween, and defining therein a flow path lying in an imaginary plane, the inlet and outlet each having an internal cross-sectional area having a first dimension in a direction along the plane and a second dimension in a direction perpendicular thereto; the first and second dimensions being the largest dimensions of each internal cross sectional area in the respective directions; the first dimension having a different magnitude of length than the second dimension.

It will be understood that a conduit having the internal cross-sectional area above can have greater flexibility than a similar conduit having a circular internal cross-sectional area or cross sectional area having an identical dimension in the first and second directions.

The first dimension of the internal cross-sectional area can have a greater magnitude of length than the second dimension thereof.

The internal cross-sectional area can be formed with a shape which is a smooth closed curve. The internal cross-sectional area can be formed with an oval, pear-like or elliptical shape.

The inlet and outlet can each have an external cross-sectional area having a first dimension in a direction along the plane and a second dimension in a direction perpendicular thereto; the first and second dimensions being the largest dimensions of each external cross sectional area in the respective directions; the first dimension having a different magnitude of length than the second dimension.

The first dimension can have a greater magnitude of length than the second dimension.

The external cross-sectional area can be formed with a shape which is a smooth closed curve. The external cross-sectional area can be formed with an oval, pear-like or elliptical shape.

At least a portion of the curved shape can be formed with an internal cross-sectional area having a first dimension in a direction along the plane and a second dimension in a direction perpendicular thereto; the first and second dimensions being the largest dimensions of the internal cross sectional area of the curved shape in the respective directions; the first dimension having a different magnitude of length than the second dimension.

The first dimension can have a greater magnitude of length than the second dimension.

The at least a portion of the curved shape can be formed with a shape which is a smooth closed curve. The at least a portion of the curved shape can be formed with an oval, pear-like or elliptical shape.

The at least a portion of the curved shape can be the entire curved shape.

At least a portion of the curved shape can have a varying cross-sectional shape.

When viewed in a side view, the curved portion can comprise a first S-shaped section having a first portion extending from the inlet, a linear section extending from a second portion of the S-shaped section, and a second S-shaped section having a first portion extending from the outlet and a second portion extending from the linear section.

When the plane is a vertical plane, any of the inlet, outlet and linear section can extend horizontally.

The inlet, outlet and linear section can all extend horizontally.

The first portion of the S-shaped section can comprise sub-portions. A first sub-portion of the S-shaped section can be formed with a bend creating a curved flow path of between 60 and 90 degrees or between 90 and 180 degrees. In a case of a bend of 60 and 90 degrees, the bend can end in an upwardly extending part which extends in a direction slanted away from an imaginary vertical axis and forms an obtuse angle with an adjacent inlet or outlet. In a case of a bend of 90 and 180 degrees, the bend can end in an upwardly extending part which extends in a direction slanted away from an imaginary vertical axis and forms an acute angle with an adjacent inlet or outlet. A second sub-portion can follow a linear path. The second sub-portion can have a varying cross-sectional shape.

The second portion of the S-shaped section can be formed with a bend of between 60 and 90 degrees or between 90 and 180 degrees. Such bend can end in a horizontally extending part.

The curved portion can further comprise a sensor mount disposed on a second portion of one of the S-shaped sections.

The sensor mount can be integrally formed with the curved portion.

The linear section can extend along an axis and the sensor mount can be disposed on the axis. A portion of the S-shaped section which lies on the axis can be disposed between the sensor mount and the linear section.

It will be appreciated that by increasing space from the sensor mount to the midpoint of the conduit, greater sensitivity can be achieved thereby increasing accuracy of measurement of the sensor.

The conduit can be formed with at least one reinforced wall portion having a greater thickness than wall portions of the conduit adjacent thereto. The reinforced wall portion can be at a connection area of the curved portion and inlet and/or outlet. The reinforced wall portion can be at a curved part of the curved portion. The reinforced wall portion can be at an intersection of the inlet and S-shaped section. The reinforced wall portion can be at an intersection of the outlet and S-shaped section. The reinforced wall portion can be at an intersection of the linear section and S-shaped section. The reinforced wall portion can be an annular rib disposed on the inlet and/or outlet. The reinforced wall portion can reinforce the inlet and/or outlet. The reinforced wall portion can reinforce a connection area of the inlet and/or outlet with the curved portion. The reinforced wall portion can include a bridge-like portion extending between the inlet and outlet.

A portion of the curved shape can be formed with an internal cross-sectional area having a first dimension in a direction along the plane and a second dimension in a direction perpendicular thereto; the first and second dimensions being the largest dimensions of each internal cross sectional area in the respective directions; the first dimension having a smaller magnitude of length than the second dimension. The portion can be the linear section of the curved shape.

It will be appreciated that having the first dimension of the internal cross-sectional area of a portion of curved shape having a smaller magnitude of length than the second dimension can form a more compact conduit shape than could be the case if the first dimension was equal or larger than the second dimension. For example, if the plane extends vertically such construction can allow the portion to have its largest dimension extending slanted or perpendicular to a vertical axis, causing the overall height of the curved shape to be reduced.

At least a portion of the curved portion can have a smaller internal cross-sectional area than the internal cross-sectional area of the inlet and/or outlet. The at least portion of the curved portion can be a majority of the curved portion.

It will be appreciated that reducing the internal cross-sectional area of the curved portion can accelerate the flow velocity of the fluid thereby allowing a smaller conduit to be used than a comparative conduit with a uniform internal cross-sectional area.

Accordingly a Coriolis flow meter conduit, and consequently a meter comprising same, with a reduced height structure can be achieved.

Without being bound to theory, the conduit according to the subject matter of the present application is flexible as a result of having a construction which has a vertical dimension of different length than a horizontal dimension thereof (tall and thin or short and wide) allowing increased movement (amplitude) of the conduit when compared with structure formed with equal vertical and horizontal dimensions such as a circular internal cross-section.

A further advantage of such conduit can be that a first resonance frequency thereof is higher than a comparative conduit of greater vertical dimension, which results in an operating frequency higher than interfering mechanical frequencies and in faster response time of the system.

Still a further advantage of such conduit can be that the flexibility of at least the inlet and outlet having the above-described shape is that less driving power is required to excite the conduit as it can be moved with less force (i.e. better compliance) than a comparative conduit of greater vertical dimension.

The conduit can be produced by machining.

The conduit can further comprising a wall having opposing surfaces each of which being in fluid communication with the flow path. Such construction can be achieved by machining. In such case the conduit can be formed with a slot adjacent the linear section thereof. The slot can extend in the same direction as the first dimension of the cross-sectional area.

It will be appreciated that the construction above can be advantageously produced by machining as opposed to other production methods which include a step of bending.

The conduit can be produced by molding. The entire conduit can be molded in a single production step.

The reinforced wall portion can be added to the conduit via a step of molding. The reinforced wall portion can be added to the conduit in the same step of molding in which the conduit is produced. The reinforced wall portion can include outer or inner ribs for strength in a desired direction. A reinforced wall portion can be a rib extending from the inlet to the outlet.

The sensor mount can be added to the conduit via a step of molding. The sensor mount can be added to the conduit in the same step of molding in which the conduit is produced.

It will be appreciated that the construction above can be advantageously produced by molding as opposed to other production methods which include a step of bending.

The conduit can have an inlet end having a diameter D, a maximal width W in a direction perpendicular to the first and second dimensions of the internal cross sectional area of the inlet and outlet, and a maximal height H in a direction parallel with the first dimension of the internal cross sectional area, the conduit fulfilling the conditions H<4D and W<6.25D. The condition fulfilled can be H<3D and W<5.2D. A further condition which can be fulfilled is that the maximum thickness T1 of the conduit can be T1<2D. When there are two conduits, another condition can be that the two conduits, including a space therebetween (D1), have a thickness T2 which fulfills the condition $T_2$<4D.

For example, calculated dimensions for meter according to the subject matter of the present application to be used with a 6 inch diameter supply line the horizontal dimension can be 685 mm or less and the vertical dimension from the center of the inlet end to the highest point of the conduit can be 350 mm or less.

It will be appreciated that a conduit having such dimensions can be considered to have a compact shape. Such compact shape can allow installation in relatively small areas, ease of transportation etc, when compared with conduits having one dimension significantly greater than the other (i.e. having an elongated shape as opposed to a compact shape).

The conduit can be formed with a uniform wall thickness. The conduit can be formed with different walls thicknesses at different parts thereof. The conduit can have a wall thickness of between 5 mm to 10 mm.

The conduit can be made of composite materials and/or a combination of different materials. The conduit may be steel, stainless steel, titanium, molybdenum, or a glass-based material or silicon-based material or any other material or combination of some materials or alloys. Such composite materials can include any type of matrix material and structure and includes any type and direction of fibers.

According to another aspect of the subject matter of the present application, there is provided a Coriolis mass flow meter splitter formed with a main chamber and two branch chambers extending from the main chamber and being separated by a separation wall disposed therebetween; the separation wall being formed with a shape which diverges from a location proximate to the main chamber to a location more distant thereto.

It will be understood that such splitter can have an insignificant pressure drop due to a smooth flow path from the main chamber to the branch chambers facilitated by the diverging shape of the separation wall.

Another advantage can be that the splitter can cause only a gradual pressure drop. It is noted that in any flow path there is always some pressure drop, however the present design may reduce a pressure drop to be insignificant.

The splitter can be formed with a transition chamber disposed between the main chamber and branch chambers. The transition chamber can have a cross sectional area greater than the main chamber's cross-sectional area.

The main chamber can comprise an inlet end.

The branch chambers can each comprise an outlet end.

A sum of cross-sectional areas of outlet ends of the branch chambers can be equal to a cross-sectional area of the inlet end of the main chamber. A sum of cross-sectional areas of outlet ends of the branch chambers can be between 80-100% the size of a cross-sectional area of the inlet end of the main chamber; This percentage difference can still cause a small pressure drop but will still have far better efficiency than known splitters.

The splitter can have at least a portion of an internal cross-section of at least one of the branch chambers formed with an oval, pear-like or elliptical shape.

The main chamber can define a main flow path therein and two branch chambers can each define therein a respective branch flow path; the main and branch chambers each having a cross-sectional area lying in an imaginary plane perpendicular to its direction of flow path, the sum of the cross-sectional areas of the branch chambers being equal to the cross-sectional area of the main chamber.

At least a portion of an internal cross-section of one of the branch chambers can be formed with a shape which is a smooth closed curve. The at least a portion of the internal cross-section of the branch chamber can be formed with an elliptical shape. That is to say, at least a portion of an internal cross-section of at least one of the branch chambers can be formed with an oval, pear-like or elliptical shape. The at least a portion of the internal cross-section of the branch chamber can be an outlet end of the branch chamber. The at least a portion of the internal cross-section of the branch chamber can be the entire branch chamber. Both branch chambers can have an internal cross-section formed with a shape which is a smooth closed curve. Both branch chambers can have such internal cross-section shape as described above.

The branch chambers can be formed with varying cross-sectional shapes having the same cross-sectional area.

The center of the outlet end of one or both of the branch chambers can be at the same height as the center of the inlet end of the main chamber. The center of the outlet end of one or both of the branch chambers can be at a height lower or higher than the center of the inlet end of the main chamber.

The separation wall can be formed with a ridge portion. The ridge portion can be formed with two opposing surfaces, each of which being parallel with a main flow path of the main chamber.

The splitter can further comprise a flange configured to connect to a pipe.

The flange can be configured to also connect to a safety cover of the meter. Such safety cover can be for secondary containment.

The splitter can be made of any of the materials described above in connection with the conduit.

According to still a further aspect of the subject matter of the present application, there is provided a Coriolis mass flow meter splitter formed with a main chamber defining therein a main flow path and two branch chambers each extending from the main chamber and defining therein a respective branch flow path; the main and branch chambers each having a cross-sectional area lying in an imaginary plane perpendicular to its direction of flow path, the sum of the cross-sectional areas of the branch chambers being equal to the cross-sectional area of the main chamber.

The splitter can have any of the features described above in connection with any other aspect.

The splitter can have any of the advantages described above in connection with the previous aspect.

According to yet another aspect of the subject matter of the present application, there is provided a Coriolis mass flow meter comprising a conduit and a single exciter configured to operate the meter.

The conduit can have any of the features described above in connection with any other aspect.

The meter can further comprise a splitter. The splitter can have any of the features described above in connection with any other aspect.

The exciter can be connected to a linear section of the conduit. The exciter can be connected to a midpoint of the conduit. The midpoint can be an equal distance along a flow path of the conduit from the inlet and outlet.

The exciter can be any device which can apply an appropriate excitation force. The exciter can be a voice coil motor, a DC brush or brushless motor, a stepper motor, a piezoelectric mechanism, or a linear motor including but not limited to pancake motors or rod shape (cylinder) motors. In order to reduce motor size, a flywheel can be used.

Additional design option is switching the location of voice coil and sensors.

The exciter can have any of the features described in connection with any other aspect.

The meter can comprise a mounting mechanism configured to hold the exciter.

The mounting mechanism can comprise two elongated elements. The elements can be made of metal, for example stainless steel, steel or aluminium.

The mounting mechanism can have any of the features described in connection with any other aspect.

According to still another aspect of the subject matter of the present application, there is provided a Coriolis mass flow meter comprising two conduits, an exciter having an element configured to apply a force in a direction along an axis and cause motion of the conduits, and a mounting mechanism having a first end configured to hold the exciter and a second end configured to be connected to a portion of each of the two the conduits, the mechanism being further configured to transfer the applied force from the element to the conduits thereby causing the motion thereof; the portions of the two conduits being spaced from each other, along a direction parallel to axis, a distance smaller than the largest dimension of the exciter measured along the axis.

The conduits can have any of the features described above in connection with any other aspect.

The meter can further comprise a splitter. The splitter can have any of the features described above in connection with any other aspect.

The exciter can have any of the features or positions described in connection with any other aspect.

The meter can comprise a mounting mechanism configured to hold the exciter.

The mounting mechanism can have any of the features described in connection with any other aspect.

It will be appreciated that in accordance with any of the aspects above:

any of the shapes described above as being formed with a smooth closed curve (of the conduit or splitter), can be, for example, oval-shaped, pear-like-shaped or an ellipse; in the case of oval-shaped or an ellipse a ratio of magnitude of length of an internal maximal longitudinal dimension of the shape to an internal maximal dimension perpendicular thereto, can be at least 1.5:1, or at least 2:1, and preferably less than 5:1; such shape can vary at different points along the length of the respective element in connection with which it is described; such shape can be a uniform shape at different points along the length of the respective element in connection with which it is described;

the meter can comprise a safety cover;

the meter can comprise a single conduit; the meter can comprise two conduits; in the case of a single conduit, the meter can further comprise a chassis for holding the exciter in a desired location while it provides motion to the conduit; the chassis can be connected to any other object which arrests the motion thereof, such objects can be, for example, a safety cover of the meter, the pipes and/or flanges connected to, or of, the meter, the splitter, the connection area of the splitter and conduit.

the meter can comprise at least one sensor (optional features of which are described below); the meter can comprise two such sensors;

the meter can comprise a motion restriction element to restrict motion in a desired direction only; such element can include a set of bearings, linear type bearing or bushing type or any other form of leading enforcement mechanism.

The meter of the subject matter of the present application can have at least one sensor for measuring any of the following: acceleration, velocity, displacement, position, magnetic field, Hall Effect, proximity, conductivity, resistance, strain, optical and temperature. It will be appreciated that values such as flow rate can be calculated from measured values. The at least one sensor can be configured to measure liquids, gases, steam and multi-phase flow.

The meter can comprise two sensors each of which measure one of the following parameters: velocity, amplitude and acceleration. Using any one of these parameters the flow rate can be calculated.

BRIEF DESCRIPTION OF THE DRAWINGS

In order to understand the subject matter of the present application and to see how it may be carried out in practice, embodiments will now be described, by way of non-limiting example only, with reference to the accompanying drawings, in which.

DETAILED DESCRIPTION OF EMBODIMENTS

Figure 1:
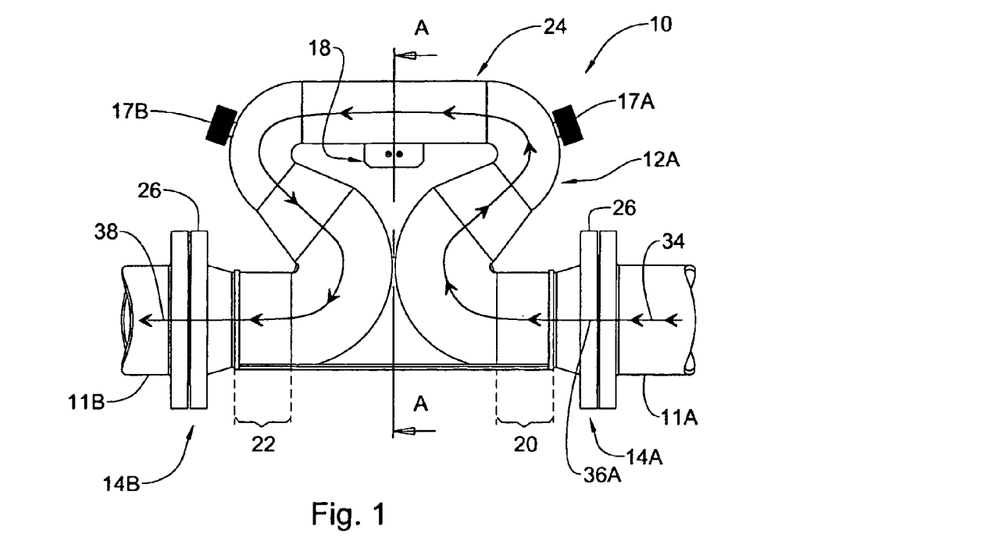
FIG. 1 is a schematic side view of a flow meter in accordance with the subject matter of the present application, connected between two pipes.
Figure 2:
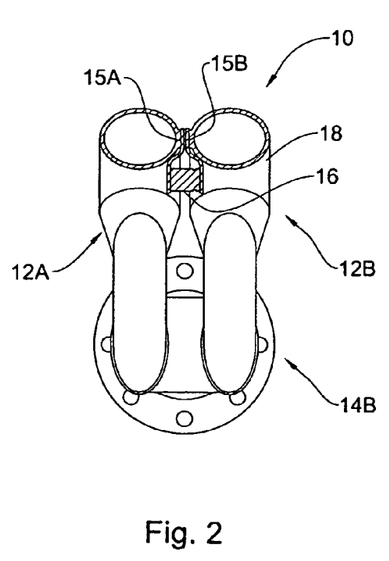
FIG. 2 is a schematic front view of the flow meter in FIG. 1.
Figure 3:
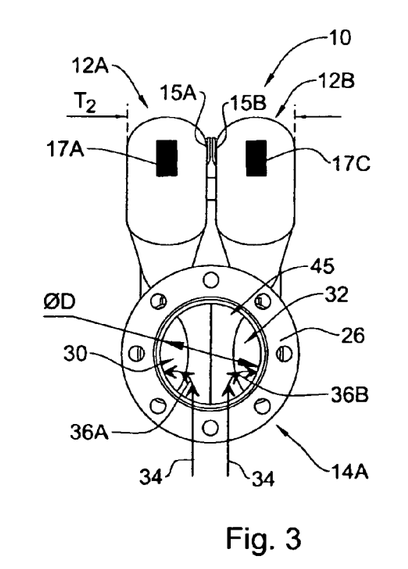
FIG. 3 is a schematic sectional view of the flow meter in FIG. 1 along section line A-A.

Referring now to the drawings wherein like reference characters designate like or corresponding parts throughout several views, with reference to FIGS. 1 to 3, there: is illustrated a Coriolis mass flow meter generally designated by the numeral 10, for measuring a mass flow rate of fluid passing therethrough (not shown). Such fluid being transported to the meter 10 via a supply pipe 11A, which in this example has an internal diameter of 6 inches, and transported away therefrom by an exit pipe 11B.

The meter 10 comprises two conduits (12A, 12B), two splitters (14A, 14B), an exciter 16, and a motion mechanism generally designated as 18 being configured to hold the exciter 16 to midpoints (15A,15B) of the conduits (12A, 12B), and transfer forces applied thereon by the exciter 16 thereto, and two sensors (17A,17B,17C,17D—not seen) mounted on each of the conduits (12A, 12B).

For a better understanding of the position of the midpoints (15A,15B), it is noted that section line A-A theoretically divides the conduits (12A,12B) into two equal halves, and therefore also coincides with midpoints (15A,15B) of the conduits (12A, 12B).

Each conduit (12A, 12B) comprises an inlet 20, an outlet 22, and a curved portion, generally designated as 24, extending therebetween.

Each splitter (14A, 14B) comprises a flange 26 which is configured to secure the splitter (14A, 14B) to a respective pipe (11A,11B) in a fluid tight manner. Each splitter (14A, 14B) is formed with a main chamber 28 and two branch chambers (30, 32).

In operation, fluid (not shown) is supplied to the meter 10 via the supply pipe (11A). The fluid follows a flow path (34) from the supply pipe (11A) into the first splitter (14A). In the splitter (14A) the flow path (34) is split into two branch flow paths (36A,36B) each of which exits a respective branch chamber (30,32) and enters a respective conduit (12A,12B). The flow paths (36A,36B) in the conduits (12A,12B) subsequently reaches the second splitter (14B) and converge to a single flow path (38) before entering the exit pipe (11B).

The exciter 16 applies forces to the mounting mechanism (18) causing motion thereof. The motion of the mounting mechanism causes motion of the conduits (12A,12B) connected thereto. The sensors (17A, 17B, 17C, 17D) measure a selected parameter (such as, for example, velocity). Measured values of the sensors (17A, 17B, 17C, 17D) are used to determine a flow rate of fluid through the meter (10).

Figure 4:
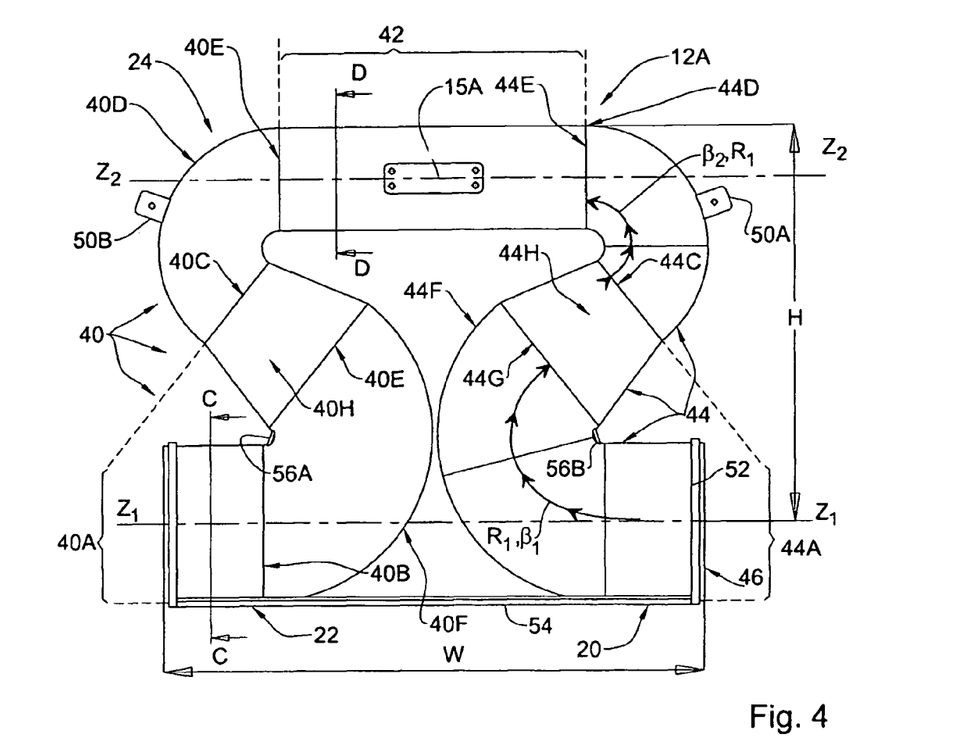
FIG. 4 is a schematic side view of a conduit of the flow meter in FIGS. 1 to 3.
Figure 5:
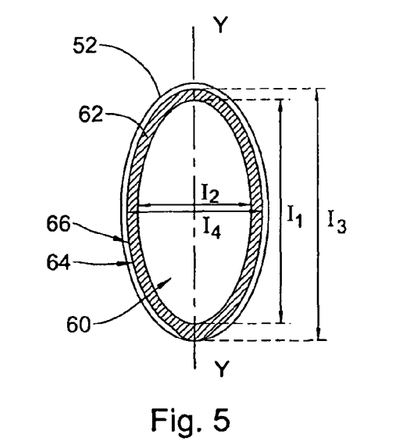
FIG. 5 is a schematic side sectional view of the flow meter in FIGS. 1 to 5 along line C-C in FIG. 4.
Figure 6:
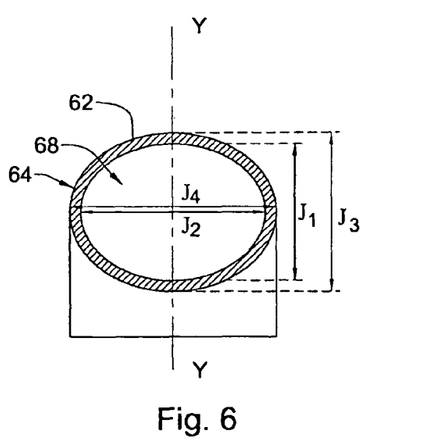
FIG. 6 is a schematic sectional view of the conduit in FIG. 4 along section line D-D.

Referring now to FIGS. 4 to 6, a further description of the conduit 14A (which has an identical structure to the conduit 14B) will now be provided.

As can be seen in FIG. 4, when the conduit 12A is viewed in a side view, the curved portion 24 can comprise a first S-shaped section 40 extending from the outlet 22, a linear section 42 extending from the first S-shaped section 40, and a second S-shaped section 44 extending to the inlet 20.

The first and second S-shaped section (40,44) have identical constructions, therefore the description below relating to one such section also relates to the other mutatis mutandis, with corresponding letters identifying corresponding parts.

The first S-shaped section 40 has a first portion 40A extending from, but not including, the outlet 22 (starting from the imaginary line designated as 40B which indicates the end of the linear section of the conduit adjacent an end 48 thereof) which extends to the imaginary line designated 40C.

The first S-shaped section 40 also has a second portion 40D extending from the imaginary line 40C to an imaginary line 40E, which is the start of the linear section 42.

The first portion 40A, can further be divided into two sub-portions. A first sub-portion 40F, extending between imaginary lines 40B and 40G, and a second sub-portion 40H extending between imaginary lines 40G and 40C.

There is also seen in FIGS. 5 and 6 a vertical plane Y extending vertical and horizontally, and which also extends through the conduit (not shown in FIG. 4) in a direction parallel with a width dimension designated by the character W in FIG. 4.

For ease of explanation, there is also illustrated a first horizontal imaginary axis $Z_1$ and a second imaginary horizontal axis $Z_2$.

The first imaginary horizontal axis $Z_1$ extends through a midpoint of inlet and outlet ends (46, 48).

The second imaginary horizontal axis $Z_2$ extends through the middle of the linear section 42.

As can be seen with respect to the first and second imaginary horizontal axes ($Z_1$, $Z_2$), the first sub-portion 44F is formed with a bend such that a flow path from the inlet 20, which in this example is a horizontal flow path, is redirected in a clockwise direction about 141 degrees ($\beta1$).

The second sub-portion 44H has a linear flow path therethrough, and has a varying cross-sectional shape.

The second portion 44D of the second S-shaped section 44 is formed with a counterclockwise bend of about 141 degrees ($\beta2$).

Figure 9:
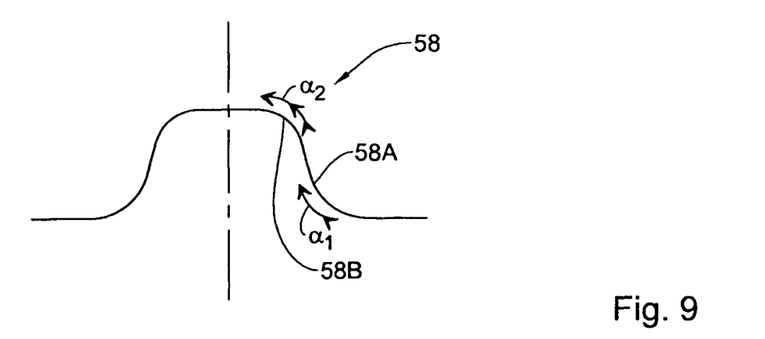
FIG. 9 is a schematic side view of a conduit in accordance with the subject matter of the present application.
Figures 10A, 10B, 10C, 10D, 10E:
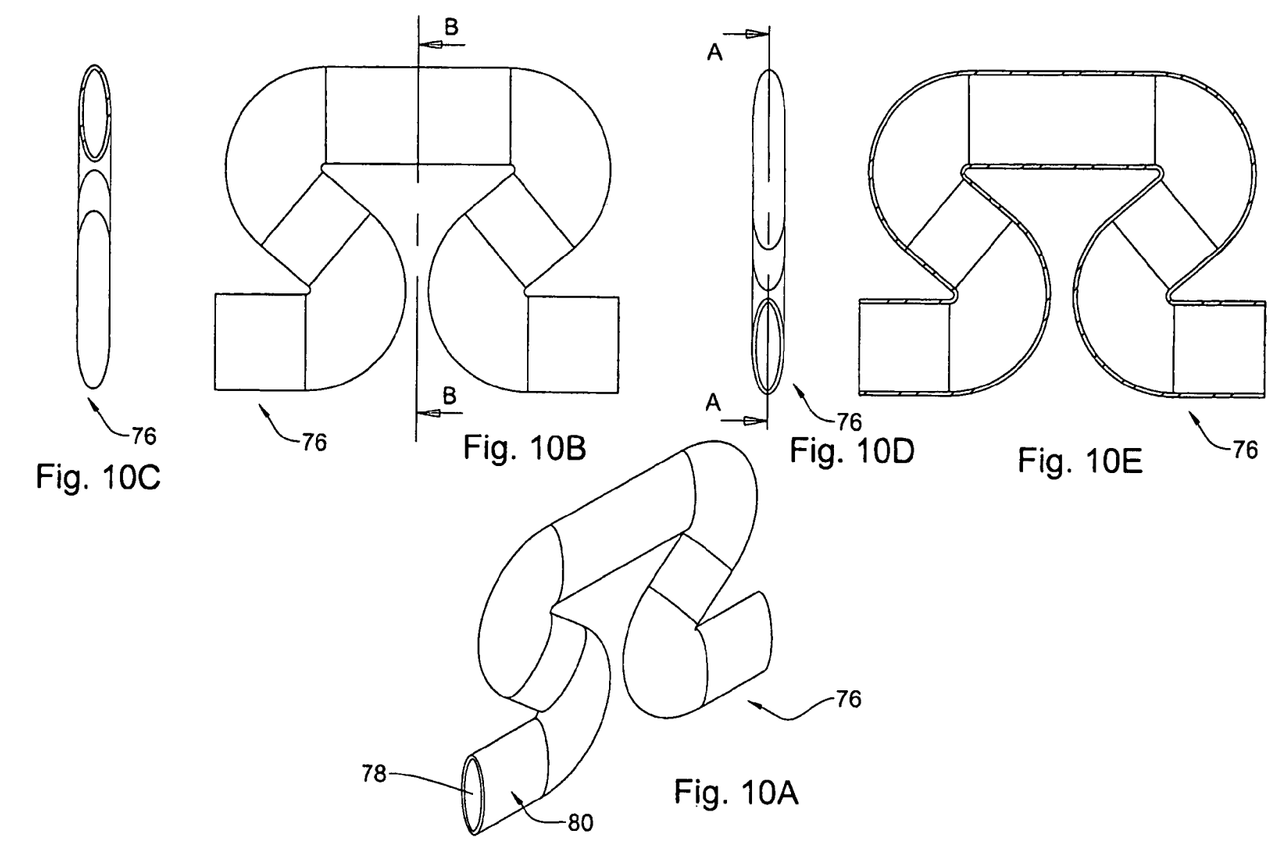
FIG. 10A is a schematic perspective view of another example of a conduit in accordance with the subject matter of the present application.
FIG. 10B is a schematic side view of the conduit in FIG. 10A.
FIG. 10C is a schematic sectional view of the conduit in FIGS. 10A and 10B along section line B-B of FIG. 10B.
FIG. 10D is a schematic rear view of the conduit in FIGS. 10A to 10C.
FIG. 10E is a schematic sectional view of the conduit in FIGS. 10A to 10D along section line A-A of FIG. 10D.

Referring briefly to FIG. 9, an alternative conduit shape 58 is shown. In such example a comparative first sub-portion 58A is formed with a bend such that a flow path from the inlet 20, which in this example is a horizontal flow path, is redirected in a clockwise direction about 75 degrees ($\alpha1$).

The second bend 58B is formed with a counterclockwise bend of about 75 degrees ($\alpha2$).

The path radius $R_1$ at the first sub-portion 44F is 90 mm and at the second sub-portion 44D $R_2$ is 70 mm. It will be appreciated that in some embodiments these values can vary up to 20%.

Reverting to FIG. 4, each S-shaped section (40,44) is formed with a sensor mount (50A,50B) configured to have one of the sensors (see FIG. 1; 17A-17D) mounted thereon.

Notably, the sensors are disposed a maximum distance from the midpoint 15A of the conduit, in a direction parallel with the second imaginary horizontal axis Z2. It will be understood that spacing the sensors from the source of motion will result in the sensors being moved at a greater velocity than would be the case if they were closer thereto.

As the conduit in this example is formed via molding, the sensor mount (50A,50B) is integrally formed with the curved portion 24.

The normal wall thickness of the conduits (12A,12B) in the present example is about 7 mm.

Reinforced wall portions, e.g. portions of the conduit 12A wall which are thicker than the majority of the wall, such as an annular rib 52 near the inlet end 46, a bridge-like portion 54 extending between the inlet 20 and outlet 22, and at a connection area (56A, 56B) of the curved portion and inlet and outlet, can be provided to increase the lifespan of the conduit. In this example, such reinforced portions were also produced via molding.

It is noted that the conduit 12A has a compact shape.

There is illustrated an inlet end 46 having a diameter D (FIG. 2), a maximal width W (FIG. 4) in a direction perpendicular to the first and second dimensions of the internal cross sectional area of the inlet and outlet, and a maximal height H (FIG. 4) in a direction parallel with the first dimension of the internal cross sectional area.

In this example the diameter of the inlet end 45 of the main chamber 28 is about 152.4 mm (about 6 inches; in accordance with the DN150 standard). The conduit has a height H of about 400 mm (extending from the center of the inlet end 46 to the greatest height of the conduit), a width W of about 685 mm (extending from the inlet end 46 to the outlet end 48), and a maximum width (T1,J4) of about 132 mm (FIG. 6; which in this example is the width of the linear section but could be a different portion of another conduit). Consequently the meter 10 has a comparatively short path length (about 1500 mm). However it will be appreciated that in accordance with design considerations such length could vary up to 50%. Additionally, the maximum thickness T2 of the meter in this example is 283 mm.

With reference to FIG. 5 which is a sectional view of the outlet 22 it is first noted that the outlet 22 and inlet 20 have identical constructions and therefore the following features described with reference to the outlet are the same as those of the inlet 20.

The outlet 22 has an internal cross-sectional area 60 at an outlet end 48 thereof, and defined inside a wall 62 of the conduit 12A.

The outlet 22 also has an external cross-sectional area 64 which includes an outermost surface 66 of the wall 62 of the conduit 12A.

The internal cross-sectional area 60 has a first dimension $I_1$ lying along the plane Y and a second dimension $I_2$ perpendicular to the plane Y and in the middle of the cross-sectional area 60 (a minor deviation in position has been made in the figure to facilitate viewing of an overlapping dimension).

It will be noted that the internal cross-sectional area has an elliptical shape. In this example the first dimension $I_1$ has a greater magnitude than the second dimension $I_2$. In this particular case the magnitude of length of the first dimension $I_1$ is double the magnitude of length of the second dimension $I_2$.

The external cross-sectional area 64 has a first dimension $I_3$ lying along the plane Y and a second dimension $I_4$ perpendicular to the plane Y and in the middle of the cross-sectional area 64 (a minor deviation in position has been made in the figure to facilitate viewing thereof). It will be noted that the external cross-sectional having an elliptical shape.

With reference to FIG. 6, the linear section 42 has an internal cross-sectional area 68 defined inside the wall 62 of the conduit 12A.

The linear section 42 also has an external cross-sectional area 70 which includes an outermost surface 66 of the wall 62 of the conduit 12A.

The internal cross-sectional area 68 has a first dimension $J_1$ lying along the plane Y and a second dimension $J_2$ perpendicular to the plane Y and in the middle of the cross-sectional area 68 (a minor deviation in position has been made in the figure to facilitate viewing of an overlapping dimension).

It will be noted that the internal cross-sectional area has an elliptical shape. In this example the first dimension $J_1$ has a smaller magnitude than the second dimension $J_2$. In this particular case the magnitude of length of the first dimension $I_1$ is greater than the magnitude of length of the second dimension $J_2$.

The external cross-sectional area 70 has a first dimension $J_3$ lying along the plane Y and a second dimension $J_4$ perpendicular to the plane Y and in the middle of the cross-sectional area 70 (a minor deviation in position has been made in the figure to facilitate viewing thereof). It will be noted that the external cross-sectional also has an elliptical shape.

Figure 7:
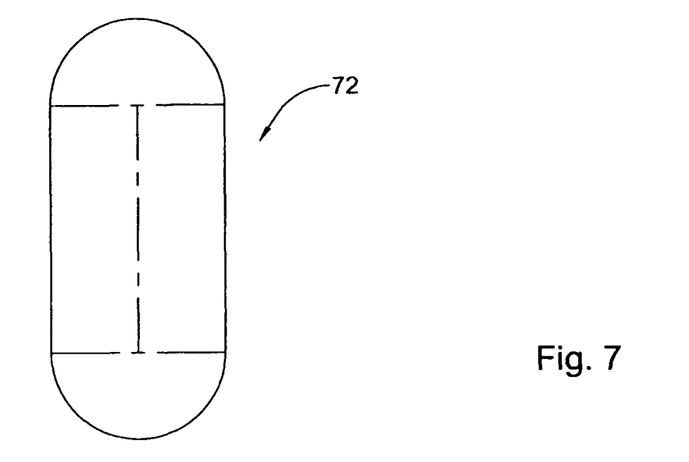
FIG. 7 is a front view of an example cross-sectional shape of an element of a flow meter in accordance with the subject matter of the present application.
Figure 8:
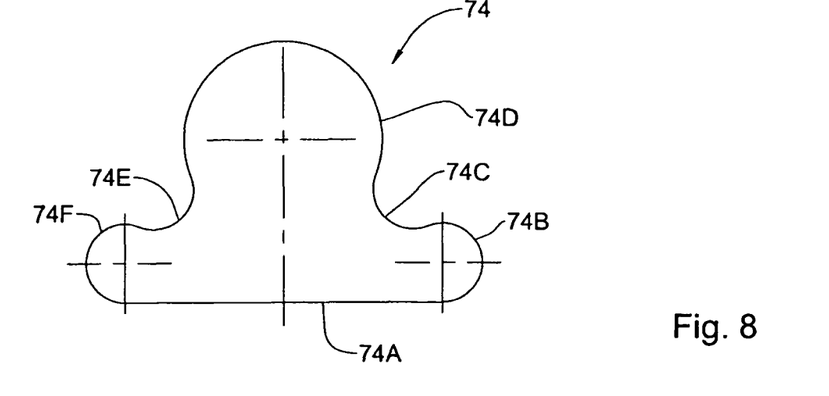
FIG. 8 is a front view of another example cross-sectional shape of an element of a flow meter in accordance with the subject matter of the present application.

It will be understood that other shapes can also be used. For example, FIG. 7 illustrates an oval shape 72 and FIG. 8 illustrates a pear-like shape 74.

The pear-like shape has a linear portion 74A, joined at either end thereof by five c-shaped portions joined in series (74B, 74C, 74D, 74E, 74F). The middle c-shaped portion 74D having a greater size than the others.

It will be appreciated that while the example conduit 12A described above with reference to FIGS. 1 to 6 has portions thereof which are not elliptical (second sub-portions 40H, 44H), it is also possible to have a uniform cross-section throughout the conduit, as seen, for example in FIGS. 10A to 10E, which illustrates a conduit 76 having an elliptical internal and external cross-section (78, 80) along the entire length thereof.

While the example conduit 12A described above with reference to FIGS. 1 to 6 is produced via molding, it should be noted that a conduit in accordance with the subject matter of the present application can also be produced by machining.

Figure 11A:
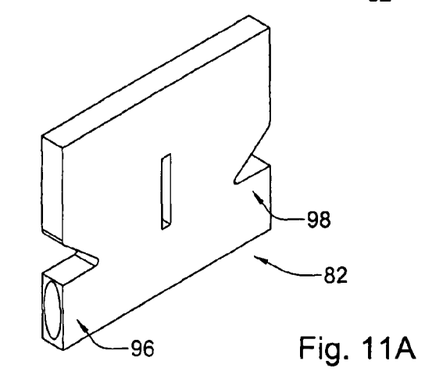
FIG. 11A is a schematic perspective view of another example of a conduit in accordance with the subject matter of the present application.
Figure 11B:
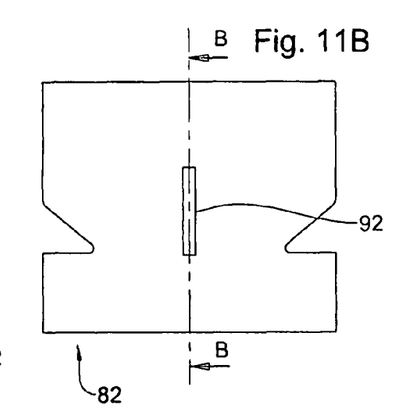
FIG. 11B is a schematic side view of the conduit in FIG. 11A.
Figure 11C:
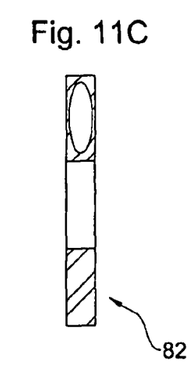
FIG. 11C is a schematic sectional view of the conduit in FIGS. 11A and 11B along section line B-B of FIG. 11B.
Figures 11D, 11E:
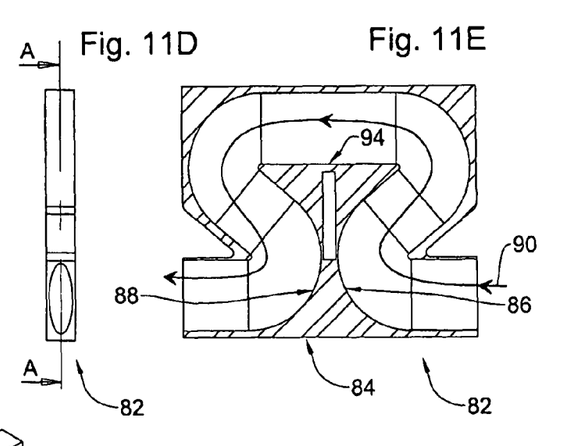
FIG. 11D is a schematic rear view of the conduit in FIGS. 11A to 11C.
FIG. 11E is a schematic sectional view of the conduit in FIGS. 11A to 11D along section line A-A of FIG. 11D.

Referring to FIGS. 11A to 1E, there is illustrated a conduit 82 comprising a wall 84 having opposing surfaces (86, 88) each of which is in fluid communication with a flow path 90 defined within the conduit 82. Additionally, the conduit 82 is formed with a slot 92 adjacent to a linear section 94 thereof.

Notably, the external cross-sectional areas of the inlet and outlet (96,98) are not curved.

Figure 12A:
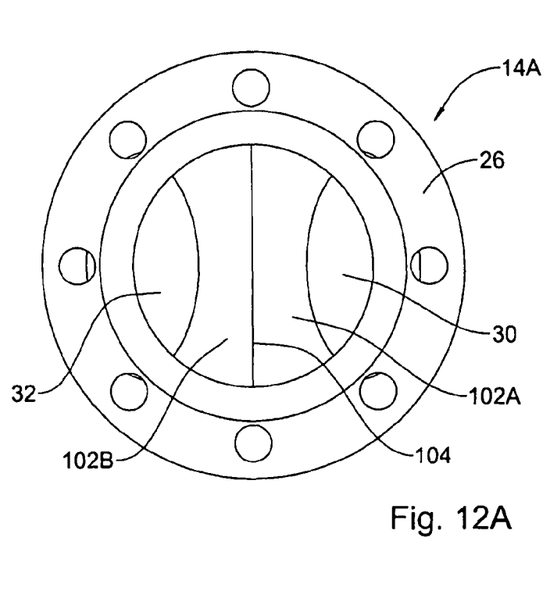
FIG. 12A is a schematic front view of a splitter of the flow meter in FIGS. 1 to 3.
Figure 12B:
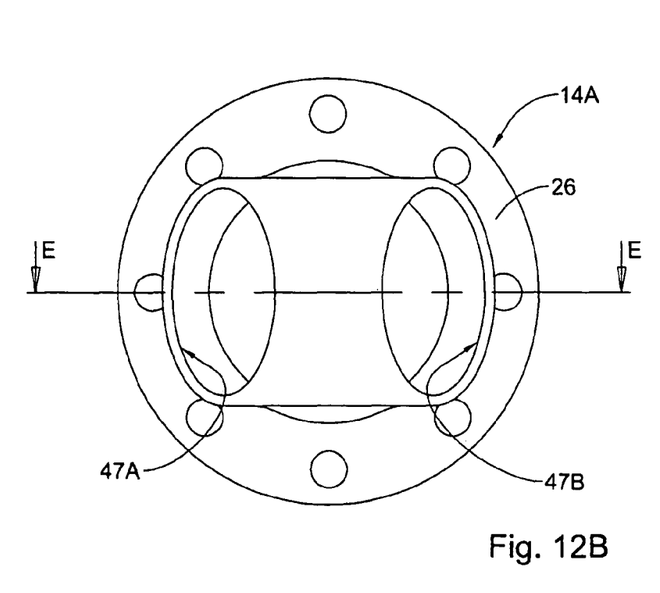
FIG. 12B is a schematic rear view of the splitter in FIGS. 1 to 3 and 12A.
Figure 12C:
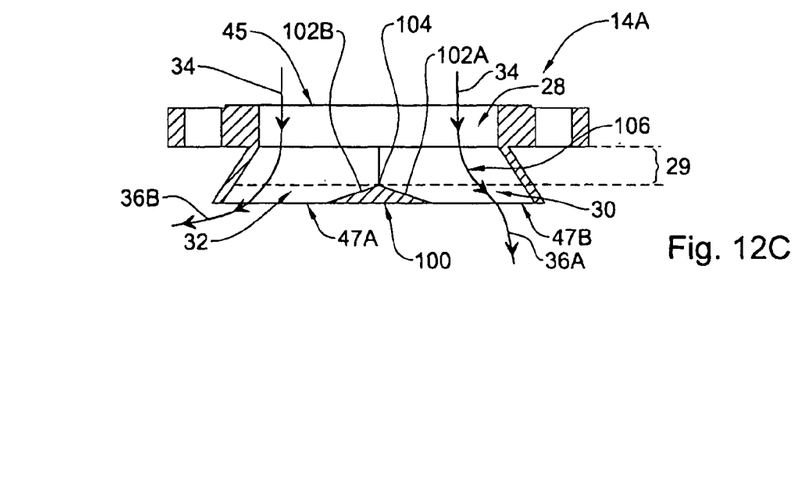
FIG. 12C is a schematic sectional view of the splitter in FIGS. 1 to 3, 12A and 12B, along section line E-E in FIG. 12B.

Drawing attention to FIGS. 12A to 12C, a further description of the splitter 14A, which is identical to splitter 14B, will be provided.

With particular reference to FIG. 12C, it is shown that the splitter 14A is formed with a main chamber 28, a transition chamber 29, and two branch chambers (30, 32).

The main chamber comprises an inlet end 45, and the branch chambers (30, 32) each comprises an outlet end (47A, 47B). The sum of the cross-sectional areas of the branch chamber outlet ends (47A, 47B) being equal to the cross-sectional area of the inlet end 45 of the main chamber 28.

The branch chamber outlet ends (47A, 47B) are elliptical-shaped and correspond to the shape of the inlet end 46 of the conduit 12A.

The branch chambers (30, 32) are separated by a separation wall 100 disposed therebetween.

The separation wall 100 is formed with a two surfaces (102A,102B) which meet at a ridge portion 104. Portions of the surfaces (102A,102B) which are further away from the ridge portion 104 than other portions thereof are also further away from the main chamber 28. In other words, the wall 100 has a diverging shape.

While it appears that at an interface 106 of the transition chamber and branch chamber 30, the cross-sectional area thereof is different to the cross sectional area at outlet end 47B, it is noted that the height of the branch chamber can be designed to vary to maintain a uniform cross-sectional area, if desired.

In operation a flow path (36,36A,36B) is smooth through the splitter. Notably the splitter is free of any wall portion which is perpendicular to the flow path 34 of fluid entering the splitter 14A.

Figure 13A:
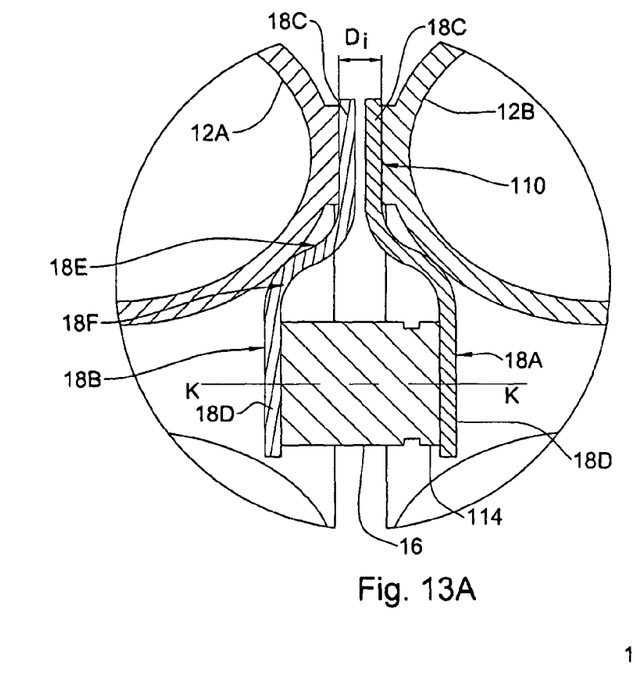
FIG. 13A is a schematic front view of an enlarged portion of the meter in FIG. 3.
Figures 13B, 13C:
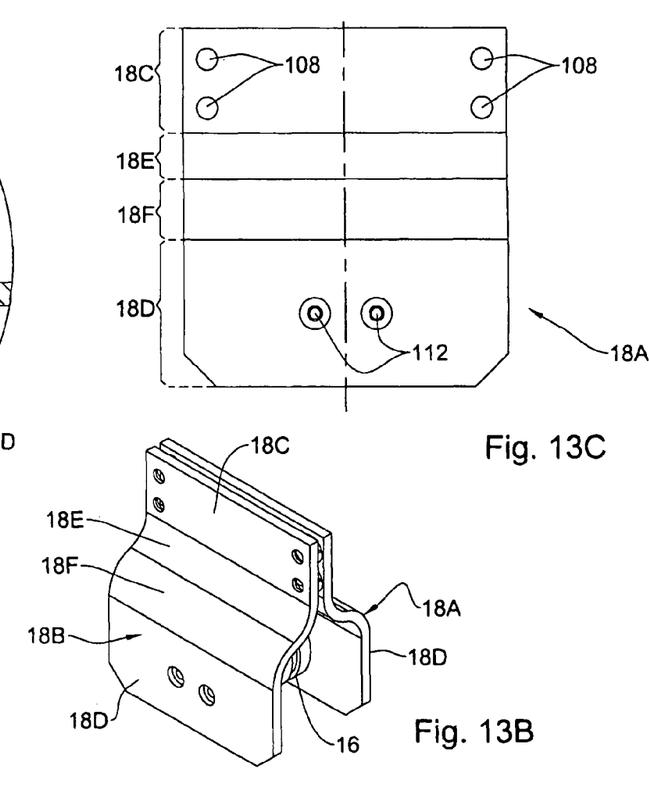
FIG. 13B is a schematic perspective view of only the mounting mechanism and exciter in FIG. 13A.
FIG. 13C is a schematic side view of the mounting mechanism in FIGS. 13A and 13B.

Referring now to FIGS. 13A to 13C, further details of the mounting mechanism 18 can be seen. The mounting mechanism comprises two brackets (18A, 18B) made of metal.

Each bracket (18A, 18B) comprises a first planar section 18C, a second planar section 18D, and two curved sections (18E,18F) extending therebetween.

When viewed in a front view (as in FIG. 13A), the two curved sections (18E,18F) can be seen to each have an curved shape which curves in a different direction to the other section such that the planar sections (18C, 18D) are parallel to each other.

The first planar section 18C is formed with apertures 108 via which the bracket 18A can be mounted to a mounting portion 110 of one of the conduits.

The second planar section 18D is formed with apertures 112 via which the exciter 16 can be mounted thereto.

In operation, the exciter expands in a direction along imaginary axis K-K, via a piston element 114 thereof, applying a force on both second planar sections 18D. The force causes the planar sections 18D to move away from each other which in turn causes the first planar sections 18C to push the conduits (12A,12B) away from each other, thereby causing excitation of the conduits.

Notably, by the conduits (12A,12B) being free of an exciter therebetween, a distance $D_i$ therebetween, which is parallel to axis K, can be made smaller than a comparative dimension of such exciter.

The invention claimed is:

1. A Coriolis mass flow meter conduit, comprising:
   an inlet, an outlet, and a curved shape extending therebetween, and defining therein a flow path lying in an imaginary plane;
   wherein the inlet and outlet each have an internal cross-sectional area having a first dimension in a direction along the imaginary plane and a second dimension in a direction substantially perpendicular thereto; the first and second dimensions being the largest dimensions of each internal cross sectional area in the respective directions; the first dimension having a different magnitude of length than the second dimension;
   wherein the conduit has an inlet end having a diameter D, a maximal width W in a direction substantially perpendicular to the first and second dimensions of the internal cross sectional area of the inlet and outlet, and a maximal height H in a direction substantially parallel with the first dimension of the internal cross sectional area, the conduit fulfilling the conditions H<4D and W<6.25D;
   wherein the conduit is formed with at least one reinforced wall portion having a greater thickness than wall portions of the conduit adjacent thereto.

2. The Coriolis mass flow meter conduit of claim 1, wherein the inlet and outlet each have an external cross-sectional area having a first dimension in a direction along the plane and a second dimension in a direction substantially perpendicular thereto; the first and second dimensions being the largest dimensions of each external cross sectional area in the respective directions; the first dimension having a different magnitude of length than the second dimension.

3. The Coriolis mass flow meter conduit of claim 1, wherein at least a portion of the curved shape is formed with an internal cross-sectional area having a first dimension in a direction along the plane and a second dimension in a direction substantially perpendicular thereto; the first and second dimensions being the largest dimensions of the internal cross sectional area of the curved shape in the respective directions; the first dimension having a different magnitude of length than the second dimension.

4. The Coriolis mass flow meter conduit of claim 1, wherein, when viewed in a side view, the curved portion comprises a first S-shaped section having a first portion extending from the inlet, a linear section extending from a second portion of the S-shaped section, and a second S-shaped section having a first portion extending from the outlet and a second portion extending from the linear section.

5. The Coriolis mass flow meter conduit of claim 1, further comprising a wall having opposing surfaces each of which being in fluid communication with the flow path.

6. The Coriolis mass flow meter conduit of claim 1, wherein the internal cross-sectional area is formed with an oval, pear-like or elliptical shape.

7. The Coriolis mass flow meter conduit of claim 1, wherein the first dimension of the internal cross-sectional area has a greater magnitude of length than the second dimension thereof.

8. The Coriolis mass flow meter conduit of claim 1, wherein the external cross-sectional area is formed with an oval, pear-like or elliptical shape.

9. The Coriolis mass flow meter conduit of claim 1, wherein at least a portion of the curved portion has a smaller internal cross-sectional area than the internal cross-sectional area of the inlet and/or outlet.

10. The Coriolis mass flow meter conduit of claim 4, wherein the curved section further comprises a sensor mount disposed on a second end of one of the S-shaped sections.

11. The Coriolis mass flow meter conduit of claim 10, wherein the sensor mount is integrally formed with the curved section.

12. The Coriolis mass flow meter conduit of claim 10, wherein the linear section extends along an axis and the sensor mount is disposed on the axis, and a portion of the S-shaped section which lies on the axis is disposed between the sensor mount and the linear section.

13. The Coriolis mass flow meter conduit of claim 1, being a part of a mass flow meter further comprising a single exciter configured to operate the meter.

14. The Coriolis mass flow meter conduit of claim 1, being a part of a mass flow meter further comprising an exciter having an element configured to apply a force in a direction along an axis and cause motion of the conduit, and a mounting mechanism having a first end configured to hold the exciter and a second end configured to be connected to a portion of the conduit, the mounting mechanism being further configured to transfer the applied force from the element to the conduit thereby causing the motion thereof; the portion of the conduit being spaced from another conduit, along a direction substantially parallel to the axis, a distance smaller than the largest dimension of the exciter measured along the axis.

15. A Coriolis mass flow meter conduit, comprising:
an inlet, an outlet, and a curved shape extending therebetween, and defining therein a flow path lying in an imaginary plane;
wherein the inlet and outlet each have an internal cross-sectional area having a first dimension in a direction along the imaginary plane and a second dimension in a direction substantially perpendicular thereto; the first and second dimensions being the largest dimensions of each internal cross sectional area in the respective directions;
wherein the conduit has an inlet end having a diameter D, a maximal width W in a direction substantially perpendicular to the first and second dimensions of the internal cross sectional area of the inlet and outlet, and a maximal height H in a direction substantially parallel with the first dimension of the internal cross sectional area, the conduit fulfilling the conditions H<4D and W<6.25D;
wherein the conduit is formed with at least one reinforced wall portion having a greater thickness than wall portions of the conduit adjacent thereto.

16. The Coriolis mass flow meter conduit of claim 15, wherein the first dimension has a different magnitude of length than the second dimension.

17. The Coriolis mass flow meter conduit of claim 15, wherein, when viewed in a side view, the curved portion comprises a first S-shaped section having a first portion extending from the inlet, a linear section extending from a second portion of the S-shaped section, and a second S-shaped section having a first portion extending from the outlet and a second portion extending from the linear section.

18. The Coriolis mass flow meter conduit of claim 15, wherein the linear section extends along an axis and the sensor mount is disposed on the axis, and a portion of the S-shaped section which lies on the axis is disposed between the sensor mount and the linear section.

19. A Coriolis mass flow meter conduit comprising:
an inlet, an outlet, and a curved shape extending therebetween, and defining therein a flow path lying in an imaginary plane;
wherein the inlet and outlet each having an internal cross-sectional area having a first dimension in a direction along the imaginary plane and a second dimension in a direction substantially perpendicular thereto; the first and second dimensions being the largest dimensions of each internal cross sectional area in the respective directions;
wherein the conduit is formed with at least one reinforced wall portion having a greater thickness than the thickness of wall portions of the conduit.

20. The Coriolis mass flow meter conduit of claim 19, wherein the first dimension has a different magnitude of length than the second dimension.

21. The Coriolis mass flow meter conduit of claim 19, wherein, when viewed in a side view, the curved portion includes a first S-shaped section having a first portion extending from the inlet, a linear section extending from a second portion of the S-shaped section, and a second S-shaped section having a first portion extending from the outlet and a second portion extending from the linear section.

* * * * *